Nov. 14, 1961  R. W. LA BERGE  3,008,847
PRIMER PAINT COMPOSITION AND WOOD COATED THEREWITH
Filed Oct. 31, 1958
INVENTOR
ROBERT W. LA BERGE
BY  *Raymond E. Blomquist*
ATTORNEY

United States Patent Office 3,008,847
Patented Nov. 14, 1961

3,008,847
PRIMER PAINT COMPOSITION AND
WOOD COATED THEREWITH
Robert W. La Berge, Magnolia, N.J., assignor to E. I.
du Pont de Nemours and Company, Wilmington, Del.,
a corporation of Delaware
Filed Oct. 31, 1958, Ser. No. 770,925
3 Claims. (Cl. 117—72)

This invention relates to paints, paint systems on wood, and their preparation. More particularly, it relates to blister resistant paint systems for the exterior of wodden houses, the preparation, and primer paints used therein.

The failure of exterior paints on wood houses by blistering due to moisture has long been a source of complaint and concern. The trend in modern home construction to more compact and tightly built structures, coupled with an increase in use of moisture producing equipment in the home, has accentuated the problem.

I have discovered a paint system which has exceptional resistance to moisture blistering in use on the exterior wood surfaces of buildings. The key element in the new system is a new paint I have developed for use as a primer for such surfaces. Various kinds of paint can be used as topcoats over the primer but I have found that the best results are obtained using a latex paint as the topcoat.

The primer paint composition of this invention is one that is particularly characterized by containing very finely ground pigment and at least one of a specified class of resins as an essential film-forming constituent.

The drawing shows an embodiment of the invention.

More specifically, it is characteristic of the primer paint composition used in preparing the finishing system of the invention that the pigment used have an average effective particle diameter of less than about 5 microns and preferably less than 1 micron, and this is so whether the pigment used constitutes prime pigment, extender pigment, or mixtures thereof. The effective diameter of a particle is calculated from optical measurements of the longest dimension, L, of the particle observed and the widest width, W, of the particle taken at right angles to that longest dimension. The effective diameter is 0.8L+0.2W. The average effective particle diameter of a pigment composition is, accordingly, the mean random rotational diameter of its particles; it is the average of the effective diameters of the particles of the composition.

The term "prime pigment" is used herein in its conventional sense to refer to those pigments having recognized high hiding power, e.g., those having an index of refraction greater than 2.0, for example titanium dioxide, basic sulfate white lead, zinc sulfide, antimony trioxide, and lithopone. Similarly, the term "extender pigment" is used in its ordinary sense to refer to pigment having low hiding power, e.g., those having an index of refraction less than 2.0, for example barium sulfate, (e.g., ground barytes and blanc fixe), calcium sulfate, magnesium silicate (e.g., talc), aluminum silicate and silica.

While it will ordinarily be preferred to use white or light colored pigment such as those mentioned for the primer paints in the practice of the invention, organic toners and colored mineral pigments can be used as is customary in paint manufacture to provide colored primer paints if desired.

In selecting a pigment or pigment mixture for the primer paints, the basic or reactive pigments such as zinc oxide, basic carbonate white lead, and calcium sulphate are preferably avoided. According to a preferred embodiment, the pigment used constitutes a mixture of prime pigment and extender pigment in a prime pigment to extender pigment weight ratio of 1:4 to 4:1. Preferably the prime pigment is titanium dioxide and the extender pigment aluminum silicate.

The total pigment content of the primer paints is limited to a pigment volume concentration of not more than about 30%, and is preferably 10%–30%. Pigment volume concentration is a term commonly used in the paint art to express the relative amount of pigment to other nonvoltatile components and is the ratio, expressed as a percentage, which the volume of pigment in the paint bears to the sum of the volume of pigment and volume of nonvolatile components in the vehicle.

The class from which the essential film-forming resin or resins are selected for use in the primer paint compositions of the invention are all drying oil modified resins. More specifically, the class consists of drying oil modified alkyl resins in which the drying oil constitutes from 50% to 70% by weight, drying oil modified phenol-formaldehyde resins in which the drying oil constitutes from 50% to 80% by weight and drying oil modified epoxy-hydroxy polyether resins in which the drying oil constitutes from 40% to 70% by weight.

Drying oil modified alkyd resins useful in the primer paints of the invention can be made according to conventional methods for making such compounds by the interaction of one or more fatty acids from drying oils with one or more polybasic acids and one or more polyhydric alcohols. This can be done conveniently, for example, by first reacting the drying oil, or a part of it, with the polyhydric alcohol and subsequently reacting the product of that reaction with the polybasic acid component. In preparing the drying oil modified alkyd resin component of the primer paints of the invention, the drying oil, polybasic acid, and polyhydric alcohol reactants are proportioned so that the drying oil constitutes from 50% to 70% by weight of the total amount of these reactants. The drying oil may be substantially completely reacted with the alkyd resin to give what is commonly known in the art as a long oil alkyd or alternatively a portion only of the drying oil may be reacted to give a short oil alkyd and the remainder of the drying oil simply mixed with the short oil alkyd to give a composition in which the total drying oil content constitutes from 50% to 70% by weight of the total amount of alkyd and drying oil.

The term "drying oil" is well understood in the paint art to refer to a variety of natural oils which contain predominantly fatty acids that are at least doubly unsaturated, such as linoleic, linolenic and elaeostearic acids. Illustrative of drying oils, and thus illustrative of oils that can be used in preparing the drying oil modified resin component of the primer paints of this invention, are linseed, dehydrated castor, tung, perilla, fish, soya, oiticica, chia, hempseed, poppy seed, safflower, sunflower and walnut oils. The oils can be used as straight oils, or as mixtures with one or more of the drying oils, or with nondrying oils such as olive, corn, and cottonseed oils. The preferred drying oil is linseed oil.

Any of the polyhydric alcohols commonly used in preparing alkyd resins can be used in making the oil modified alkyd resins employed in the compositions of this invention, for example, glycerol, pentaerythritol, sorbitol, mannitol, ethylene glycol, propylene glycol and diethylene glycol. Similarly, the polybasic acid reactants which can be used are those conventionally employed in making alkyd resins such as phthalic, isophthalic, maleic, fumaric, sebacic, adipic, and succinic.

Various of the well known substituted or modified alkyds can be used in preparing the drying oil modified alkyd resin component in place of, or in addition to, the alkyds obtained by reaction of the above named polybasic acids and polyhydric alcohols. Illustrative of such substituted alkyds are those referred to in the paint art as siliconated alkyds, methacrylated alkyds, styrenated alkyds, and allyloxy alkyds.

The drying oil alkyd resins used in the primer paint compositions of the invention will ordinarily have in addition to the drying oil content of 50%–70% an acid number of 0 to 40 and a Gardner-Holdt viscosity of G to Z6 at 83% solids. The preferred drying oil modified alkyd resin is linseed oil modified glyceryl phthalate.

Drying oil modified phenol formaldehyde resins useful in the primer paints of the invention can be made according to conventional methods for making such compositions by heating the drying oil with the phenol formaldehyde resin. Preferably the phenol formaldehyde resin is of a kind conventionally used in making what are known in the art as phenolic varnishes. Illustrative of such resins commonly used are p-tertiary butylphenol formaldehyde, p-tertiary amylphenol formaldehyde, and p-phenylphenol formaldehyde resins. The drying oil and phenolic resin are proportioned to give an oil modified phenol formaldehyde composition containing from 50% to 80% of the oil. The reaction of the drying oil and the resin is normally carried out in a solvent to provide an air drying product having a Gardner-Holdt viscosity of E–T at 60% solids.

Epoxyhydroxy polyether resins used in making the drying oil modified epoxyhydroxy polyether resins for use in the primer compositions of the invention are, as the term itself indicates, polymers having a plurality of ether oxygen atoms per molecule as well as being characterized by epoxy and hydroxy groups. These resins can be readily prepared in accordance with known practices by condensing a polyhydric phenol such as resorcinol, catechol, hydroquinone, bis-(4-hydroxyphenyl)-2,2-propane, 4,4'-dihydroxybenzophenone, bis-(4-hydroxyphenol)methane, and bis-(4-hydroxy-2-methylphenyl)-2,2-propane with an excess of an epoxy contributing compound such as epichlorohydrin, epibromohydrin, and epihalohydrins of mannitol, sorbitol, and erythritol. For example, U.S. Patents 2,503,726, 2,582,985, 2,592,560 and 2,694,694 show methods for the preparation of epoxyhydroxy polyether resins. A common and preferred such polyether resin is the one obtained by condensing two moles of epichlorohydrin with one mole of the compound frequently referred to as either bis-phenol or diphenylol propane and more specifically as 2,2-bis-(p-hydroxyphenyl)propane. Epoxyhydroxy polyether resins are currently marketed by a number of suppliers. Some, for example, are marketed under the proprietary name "Epon" (Shell Chemical Corp.) and "Araldite" (Ciba Company, Inc.).

The drying oil modified epoxyhydroxy polyether resins are conveniently prepared by heating the drying oil component and the polyether component together in a hydrocarbon solvent to obtain a composition having an acid number less than about 40 and a Gardner-Holdt viscosity between about F and Z4 at 65% solids. Optionally, rosin, phthalic anhydride and like modifiers can be included in minor amounts as is well known in the art.

The various organic solvents commonly used to dissolve resins in coating compositions, such as the aliphatic, cycloaliphatic and aromatic hydrocarbons, esters, ethers, ketones and alcohols, can be used singly or in combinations as solvent for the drying oil modified resin component in making the primer paints of this invention. Specific examples of such solvents are toluene, xylene, butyl acetate, acetone, methylisobutyl ketone, amyl alcohol, diacetone alcohol, mineral spirits, petroleum naphtha, turpentine, dipentene, pine oil, mineral oil, cyclohexanol, and aliphatic and aromatic petroleum hydrocarbons.

In addition to the oil modified resin, pigment and solvent components, the primer paints used in the practice of the invention can, and ordinarily will, contain in conventional quantities, modifying components of the kind customarily used in paints, for example driers, inhibitors, dispersing agents, mildewcides, flow control agents, and the like.

The various ingredients of the primer paint can be brought together in accordance with conventional paint formulating techniques in any desired manner to form the finished primer paint. The relative quantities of the ingredients are adjusted as required to give the desired rheological properties, including a viscosity of about 50–90 Stormer units. This may require changing or adjusting the ratio of the oil modified resin to solvent somewhat with the varying resins and solvent combinations which can be used, and/or adjusting the amounts of modifying agents such as dispersing agents and flow control agents which are used. Adjustments of this nature are commonly made in the paint formulating art to give a composition having desired rheological properties, and the relative quantites required with any given set or combination of ingredients can be readily determined by one skilled in the art by customary simple trial and test. Of course, regardless of other adjustments which may be required, the pigment volume concentration is limited so as not to exceed about 30% and is preferably maintained in the range of 10% to 30%. The oil modified resin content of the primer paints can be varied widely but will ordinarly constitute from 30% to 50% by weight of the paint.

The prime paints described above are particularly well suited for use in applying a prime coat to exterior unpainted wood surfaces of houses such as clapboard or other wood siding, wood trim, window frames, and the like. The primer paints can be conveniently applied by brushing but are also suitable for spray or roller coat application if desired. The primer paints penetrate into the wood as well as leaving a surface film, and they are unusual in that they provide substantially uniform penetration of the primer, both pigment and vehicle, into the wood, i.e., there does not occur the usual separation and penetration of the vehicle leaving a surface film of disproportionately high pigment content. The dried film provided by application of the primer paints has exceptional adhesion to the wood surface and concomitant resistance to blistering.

While the primer paints of the invention are particularly useful as primers for exterior wood on houses, the compositions can also be used as interior paints and can be applied to other substrates whether organic, inorganic, non-metallic, metallic, porous, non-porous, rigid or flexible.

In preparing the paint systems of the invention, any of the conventional house paints designed for topcoat use can be applied over the dried prime coat of the above described primer paint on wood. Thus the topcoat material can be, for example, an oil base paint such as those based on drying oil film formers (e.g., linseed oil), or modified or unmodified alkyd resins; or it can be a latex or aqueous paint such as the aqueous dispersion or emulsion paints based on such film formers as polyvinyl acetate (e.g., the compositions of U.S. 2,601,315), polystyrene, styrene-butadiene polymers, acrylic and methacrylic ester homopolymers and copolymers (e.g., the compositions of U.S. 2,795,564), vinylidene polymers, mixtures thereof, and the like.

Best results from the standpoint of blister resistance in the house paint system are obtained by using as the topcoat paint one which provides a film having a permeability to water vapor greater than that of the film obtained from the primer paint. Thus while one can use the above described primer paint as the topcoat as well as using it as a primer, or can use other resin or drying oil base paints which provide dried films not differing greatly in water vapor permeability from the film obtained using the primer paint, it is preferred to use the so-called latex paints, those characterized by being dispersions or emulsions in water, since they ordinarily have water permeability factors in the order of 10 to 15 times as great as that of the primer paint.

The water vapor permeability of a paint film can be readily determined by use of the standard so-called Payne test for determining permeability to moisture of organic surface coatings. This method is fully described in the "Official Digest" of The Federation of Paint and Varnish Production Clubs, volume 271, pages 479–483 (August 1947). Briefly, the test involves first obtaining a dry film of the material to be tested by applying a uniform thin layer (e.g., 2–3 mils) of the paint to a smooth surface such as glass and drying the layer for a definite time (e.g., two weeks) at a specified temperature (e.g., 77° F.). The dry film is then stripped from the glass and cut into a circular disc to fit a Payne Permeability Cup such as Fischer Scientific Co.'s cup #13–338. The cup is partially filled with water. The circular disc of film is then clamped over the opening of the cup and the edges are preferably sealed with a beeswax-rosin mixture or like material to avoid vapor leakage. The resulting assembly is initially weighed and then placed in a location of constant temperature (e.g., 77° F.) and relative humidity (e.g., in a desiccator containing phosphorous pentoxide as the desiccant). The assembly is then weighed at 24-hour intervals until the loss rate has become constant. The specific permeability of the film to moisture is then calculated as the milligrams of water which permeates through 1 square centimeter of film of 1 millimeter thickness each 24 hours after the constant rate has been attained.

The permeability of a film can also be conveniently expressed in terms of a permeability factor calculated by the following equation $$\text{Permeability factor} = \frac{\text{wt. loss, mgs.} \times \text{film thickness, mils}}{\text{film area, cm.}^2 \times \text{hrs.} \times \text{vapor difference in inches of Hg}}$$

The dried films obtained from the primer paints employed in the practice of this invention have a permeability factor, as determined above, in the range of about 0.01 to 0.05. Oil modified alkyd resin base topcoat compositions provide films having generally similar permeability factors. Topcoat films obtained from paints based on air drying oils such as linseed oil ordinarily have permeability factors varying from those of said primer paint films up to 2 to 3 times that of the primer paint films, depending upon their particular composition, and the latex paints ordinarily have permeability factors in the order of 10 to 15 times as great as the primer paint films.

In order that the invention may be better understood, the following examples illustrating primer paints and finishing systems of the invention and their preparation are given in addition to the examples already given above. Parts and percentages are by weight unless otherwise indicated.

EXAMPLE 1

Preparation of oil modified alkyd resin

There is charged into a reactor 450.8 parts of linseed oil and 91.5 parts of glycerine. The mixture is heated to 400° F. under a nitrogen blanket while agitating and 0.23 part of powdered litharge is added. The temperature is increased to 450° F. over a period of about 25 minutes. Then 194.8 parts of phthalic anhydride is introduced. The temperature is held at about 470° F. with agitation until the reacting mass has an acid number of 4.1 and a Gardner-Holdt viscosity of Y–Z1 when diluted with petroleum hydrocarbon solvent to 83% solids. The mass is then cooled and diluted with 145.2 parts of a petroleum hydrocarbon fraction (B.P. 175–223° C., aniline point +4° C.).

The resin solution prepared as above contains 83% solids, has a weight of 8.48 pounds per gallon, an acid number of 4.1, a Gardner-Holdt viscosity of Y–Z1, and a theoretical composition of 34.6% glyceryl phthalate, 63.7% linseed oil, and 1.7% glycerine.

Preparation of primer paint

A primer paint of this invention is prepared by dispersing titanium dioxide prime pigment and aluminum silicate extender pigment in the oil modified alkyd resin composition prepared as above using conventional paint grinding equipment and then adding the remaining constituents to produce a composition of the following formula:

| | Parts |
|---|---|
| Oil modified alkyd resin solution prepared as above | 481 |
| Titanium dioxide | 208 |
| Aluminum silicate | 127 |
| Aromatic hydrocarbon fraction, B.P. 175°–223° C., aniline point +4° C., 7.12 lbs./gallon | 133 |
| Heavy mineral spirits, B.P. 184°–250° C., aniline point +58–66° C., 6.88 lbs./gallon | 28 |
| Additives: | |
| Drier, 63% soln. lead naphthenate (24% Pb) | 18 |
| Drier, 57% soln. manganese naphthenate (6% Mn) | 3 |
| 50% solution soya lecithin in 90:10 mixture of mineral spirits and high solvency hydrocarbon | 28 |
| Mildew inhibitor, 10% soln. phenyl mercury oleate | 10 |
| Dimethyl dioctodecyl ammonium bentonite ("Bentone" 34, National Lead Co.) | 2 |

The above primer paint composition has a pigment volume concentration of 20%, weighs 10.44 pounds per gallon, contains 73% solids by weight, and 63% solids by volume.

The titanium dioxide pigment used in the primer paint of this example is a rutile pigment having an average effective particle diameter of about 0.03 micron ("Ti-Pure" R–610, E. I. du Pont de Nemours and Company). The aluminum silicate extender pigment used is an unusually finely ground product having an average effective particle diameter of 0.5 micron.

Finishing system

A coating of the primer paint composition of this example is applied at a spreading rate of 450–500 square feet per gallon to the bare wood siding and other exterior wood areas of a house which has a history of severe moisture blistering and peeling. The primer coat is then allowed to dry for about 48 hours. The abutment areas, windows, and sunken nail-head areas are then puttied and caulked as required. A white latex (aqueous emulsion) paint, of a kind set out below, is then applied to all primed areas at a spreading rate of about 500 square feet per gallon. The latex paint dries quickly and a second coat of the same paint is applied.

The housepaint system of this example is remarkably free of surface defects and of bug and dust attachment; and it is uniform in color, exceptional in whiteness, resistant to rain and wind damage within one hour after painting, and has excellent blister resistance compared with conventional oil paints over wood.

The aqueous emulsion topcoat composition used in the finishing system of this example has the following formula.

| | Parts |
|---|---|
| Acrylic ester polymer aqueous emulsion, 46% solids (Rohm and Haas Co.'s "Rhoplex" AC–33) | 554.0 |
| Titanium dioxide pigment | 225.0 |
| Extender pigments (equal parts of magnesium silicate and mica) | 138.0 |
| Water | 153.3 |
| Additives: | |
| Surfactants— | |
| Potassium tripolyphosphate | 1.0 |
| "Triton" X–100 (Rohm and Haas Co.) | 0.4 |

Additives: Parts
Stabilizer (Dow Chemical Co.'s "Methocel" 4,000) _____ 1.7
Antifoamer (Nopco Chemical Co's "Nopco" 1497-V) _____ 2.4
Mildew inhibitor—10% solution phenyl mercury oleate_____ 20.4
Ethylene glycol_____ 16.4
Ammonium hydroxide_____ 2.4

EXAMPLE 2

A primer paint of this invention is prepared by dispersing titanium dioxide prime pigment and aluminum silicate extender pigment in the oil modified alkyd resin composition prepared as above using conventional paint grinding equipment and then adding the remaining constituents to produce a composition of the following formula.

|  | Parts |
| --- | --- |
| Oil modified alkyd resin (same as Example 1) | 425 |
| Rutile TiO$_2$ pigment | 100 |
| Aluminum silicate extender pigment | 320 |
| Aromatic hydrocarbon fraction B.P. 175°–223° C., aniline point +4° C., 7.12 lbs./gallon | 147 |
| Heavy mineral spirits B.P. 184°–250° C., aniline point +58–66° C., 6.88 lbs./gallon | 28 |
| Additives: |  |
| Drier, 63% soln. lead naphthenate (24% Pb) | 16 |
| Drier, 57% soln. manganese naphthenate (6% Mn) | 3 |
| 50% solution soya lecithin in 90:10 mixture of mineral spirits and high solvency hydrocarbon | 24 |
| Mildew inhibitor, 10% soln. phenyl mercury oleate | 10 |
| Dimethyl dioctodecyl ammonium bentonite ("Bentone" 34, National Lead Co.) | 2 |

The above primer paint composition has a pigment volume concentration of 20%, weighs 10.44 pounds per gallon, contains 73% solids by weight, and 63% solids by volume.

The titanium dioxide pigment used in the primer paint of this example is a rutile pigment having an average effective particle diameter of about 0.3 micron ("Ti-Pure" R-160, E. I. du Pont de Nemours and Company). The aluminum silicate extender pigment used is very finely ground, having an average effective particle diameter of 0.5 micron, and is further identified as Edgar ASP-200 supplied by Minerals and Chemicals Corp of America.

The primer paint of this example has less hiding power than that of Example 1, but when substituted for the primer paint of Example 1 in a finishing system otherwise the same as that described in that example, the resulting performance of the system is similarly excellent.

The following table illustrates other modified alkyd resins which can be substituted for the alkyd resins of Examples 1 and 2 above in making primer paint compositions of the invention. The resin compositions referred to in the table are made acording to the general procedure described in Example 1. The content of the resin compositions is shown on a theoretical basis for convenience.

|  | Example | | | | |
| --- | --- | --- | --- | --- | --- |
|  | 3 | 4 | 5 | 6 | 7 |
| Linseed oil |  | 63.7 | 38.7 | 63.7 | 63.7 |
| Soybean oil | 63.0 |  |  |  |  |
| Glyceryl phthalate |  |  | 34.6 |  |  |
| Pentaerythritol phthalate | 33.3 |  |  |  |  |
| Glycerol adipate |  | 34.6 |  | 31.1 |  |
| Glyceryl tri-oleate |  |  | 25.0 |  |  |
| Glycol adipate |  |  |  | 3.5 |  |
| Hexanetriol phthalate |  |  |  |  | 34.6 |
| Excess glycerol |  | 1.7 | 1.7 | 1.7 |  |
| Excess hexanetriol |  |  |  |  | 1.7 |
| Excess pentaerythritol | 3.7 |  |  |  |  |
| Percent solids | 83 | 84 | 83 | 84 | 83 |
| Gardner-Holdt viscosity | Y | Z2 | Y | X | U |
| Acid Number | 6 | 7.7 | 5 | 4 | 5 |
| Gallon wt., lbs | 8.3 | 8.3 | 8.5 | 8.3 | 8.3 |

EXAMPLE 8

This example illustrates a primer paint composition of the invention in which the film-forming component is a short oil modified alkyd mixed with added oil. The short oil alkyd resin compositon has the following characteristics.

| Percent solids | 50 |
| --- | --- |
| Gardner-Holdt viscosity | Z–Z2 |
| Acid number | 12 |
| Theoretical composition: |  |
| Glyceryl phthalate | 64 |
| Soybean oil | 35 |
| Excess glycerine | 1 |

The above short oil alkyd resin composition is mixed with soybean oil in the proportions of 3 parts by weight of the short oil glyceryl phthalate resin for each part by weight of soybean oil. The mixture is formulated according to conventional methods with titanium dioxide (rutile) pigment (less than 1 micron effective particle diameter) and finely ground talc (less than 1 micron effective particle diameter), paint solvents and usual additives to give a primer paint having a pigment volume of 20%, containing 50% solids and a gallon weight of 9.8 pounds.

EXAMPLE 9

156 parts of p-butylphenol formaldehyde resin and 307 parts tung oil are heated together at 580° F. until the reacting mass has a Gardner-Holdt viscosity of K–M at 60% solids. The mass is then cooled, thinned with 154.5 parts hydrocarbon solvent (B.P. 175–223° C., aniline number +4° C.), and 148.5 parts mineral spirits. 6 parts butyraldoxime is added as an anti-skinning agent. The resulting phenolic varnish contains 60% solids and has a gallon weight of 7.60 pounds. It is formulated to provide the following primer paint composition.

| Phenolic varnish | 538.0 |
| --- | --- |
| Titanium dioxide pigment (rutile) | 177.0 |
| Aluminum silicate extender pigment | 108.0 |
| Aromatic hydrocarbon fraction, B.P. 175–223° C., aniline point +4° C | 55.0 |
| Mineral spirits | 53.0 |
| Additives: |  |
| Drier, 63% lead naphthenate solution (24% Pb) | 18.0 |
| Drier, 54% cobalt naphthenate solution (6% Co) | 3.0 |
| Drier, 59% calcium naphthenate solution (4% Ca) | 3.0 |
| 50% solution soya lecithin in 90:10 mixture of mineral spirits and high solvency hydrocarbon | 14.0 |
| Mildew inhibitor, 10% solution phenyl mercury oleate | 10.0 |

The titanium dioxide pigment used in the primer paint has an average effective particle diameter of about 0.3 micron and the extender pigment has an average effective particle diameter of about 0.5 micron. The primer paint composition has a pigment volume of 20%, a solids content by volume of 51%, a viscosity of 80 Krebs units, and a gallon weight of 10.24 pounds.

The primer paint composition of this example gives excellent results in a paint system in which it is applied as a primer to bare exterior wooden house surfaces and is particularly effective in helping to provide a blister resistant system when used under an aqueous emulsion topcoat compostion such, for example, as the acrylic emulsion paint composition specified as formulation #10 in Table I of the Rohm and Haas Co. publication entitled "Rhoplex AC-33" Progress Report 4, dated October 1957.

EXAMPLE 10

227 parts of epoxyhydroxy polyether resin ("Epon"

1004, Shell Chemical Co.), 253 parts linseed oil fatty acids, and 50 parts W.A. rosin are heated together at 480° F. for 2 hours using 0.2 part lithrage as a catalyst to obtain an oil modified resin compositon having an acid number of 5 and a Gardner-Holdt viscosity of Z–Z2 at 65% solids. The mass is then cooled and thinned with 138 parts of hydrocarbon solvent (B.P. 175–223° C., aniline point +4° C.) and 138 parts mineral spirits. The resulting resin solution contains 65% solids, has a gallon weight of 7.85 pounds and a theoretical composition of 47.8 linseed oil acids, 9.4% rosin, and 42.8% epoxy-hydroxy polyether resin. It is formulated to give the following primer paint.

| | |
|---|---|
| Oil modified resin solution | 491 |
| Titanium dioxide (aver. effective diam. $<1\mu$) | 177 |
| Aluminum silicate (aver. effective diam. $<1\mu$) | 108 |
| Hydrocarbon petroleum fraction B.P. 175–223° C., aniline point +4° C | 77 |
| Mineral spirits | 77 |
| Additives: | |
| 10% phenyl mercury oleate solution | 10 |
| 54% cobalt naphthenate solution (6% Co) | 2 |
| 50% solution soya lecithin in 90:10 mixture of mineral spirits and high solvency hydrocarbon | 19 |

The primer paint composition of this example has a pigment volume concentration of 20%, a gallon weight of 9.61 pounds, a viscosity of 82 Krebs units, and a solids content by volume of 50.4%. The primer paint of this example when substituted for the primer paint of Example 1 in a finishing system otherwise the same as that described in that example provides a system of similarly excellent characteristics and performance.

I claim:

1. A primer paint for wood which comprises up to 30% pigment volume concentration of pigment having an average effective particle diameter of less than 5 microns, said pigment consisting essentially of a mixture of prime pigment and extender pigment in a prime pigment to extender pigment weight ratio of 1:4 to 4:1, and as an essential film-forming component a drying oil modified alkyd resin in which the drying oil constitutes from 50% to 70% by weight, said paint, when in the form of a dried film, having a permeability factor between about 0.01 and 0.05.

2. A primer paint for wood which comprises as an essential film-forming component linseed oil modified glyceryl phthalate in which the linseed oil constitutes from 50% to 70% by weight, an organic solvent for said film-forming component, and 10% to 30% pigment volume concentration of pigment having an average effective particle diameter of less than 1 micron, said pigment consisting essentially of a mixture of prime pigment and extender pigment in a prime pigment to extender pigment weight ratio of 1:4 to 4:1, said paint, when in the form of a dried film, having a permeability factor between about 0.01 and 0.05.

3. A wood substrate coated with a dried film of the primer paint of claim 2 and a top coat having a permeability to water vapor greater than that of the primer paint film.

References Cited in the file of this patent

UNITED STATES PATENTS

| | | |
|---|---|---|
| 1,912,372 | Jacobson | June 6, 1933 |
| 1,927,086 | Ellis | Sept. 19, 1933 |
| 2,707,157 | Stanton et al. | Apr. 26, 1955 |
| 2,714,560 | Hookway | Aug. 2, 1955 |

OTHER REFERENCES

Blom: Organic Coatings in Theory and Practice, Elsevier Pub. Co., 1949, pages 183, 205 and 206.

Payne: Organic Coating Technology, vol. 1, John Wiley and Sons, Inc., 1954, pages 296–299.

Von Fischer et al.: Organic Protective Coatings, Reinhold Pub. Corp., 1953, pages 48 and 49.